US006569478B1

(12) United States Patent
Leser et al.

(10) Patent No.: US 6,569,478 B1
(45) Date of Patent: May 27, 2003

(54) FOOD COMPOSITION CONTAINING A MONOGLYCERIDE MEMOMORPHIC PHASE

(75) Inventors: Martin Leser, Morrens (CH); Sylvain Vauthey, Boston, MA (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/617,952

(22) Filed: Sep. 13, 2000

Related U.S. Application Data

(63) Continuation-in-part of application No. PCT/EP99/01631, filed on Mar. 12, 1999.

(30) Foreign Application Priority Data

Mar. 13, 1998 (EP) .............................. 98104598

(51) Int. Cl.[7] .............................. A23D 7/00; A23D 7/02
(52) U.S. Cl. ..................... 426/89; 426/654; 426/601; 426/602; 426/604
(58) Field of Search .................. 426/89, 654, 601, 426/602, 604

(56) References Cited

U.S. PATENT DOCUMENTS

| 3,320,070 | A | * | 5/1967 | Hartman | |
| 4,226,890 | A | | 10/1980 | Howard | 426/92 |
| 5,620,734 | A | | 4/1997 | Wesdorp et al. | 426/601 |
| 5,652,011 | A | | 7/1997 | Heertje et al. | 426/601 |
| 5,908,697 | A | | 6/1999 | Roux et al. | 428/402.2 |

FOREIGN PATENT DOCUMENTS

| EP | 0 547 647 | 6/1993 |
| EP | 0 664 083 | 7/1995 |
| FR | 2 735 658 | 12/1996 |
| NL | 8402867 | 4/1986 |
| WO | WO 84/02076 | 6/1984 |
| WO | WO 92/09209 | 6/1992 |
| WO | WO 93/06921 | 4/1993 |

OTHER PUBLICATIONS

Food Technology. "Monoglycerides in Food Systems: Current and Future Uses". Aug. 1997. vol. 51, No. 8. pp. 52–54, 56, 58, and 59. Author: Boyle.*

* cited by examiner

Primary Examiner—Anthony J. Weier
(74) Attorney, Agent, or Firm—Winston & Strawn

(57) ABSTRACT

The invention is directed to a food composition in an aqueous or instant powder form that contains at least one food ingredient, a monoglyceride enriched with unsaturated compounds, and water. The monoglyceride is preferably a monoglycerol monoester that has up to about 90% of $C_{18}$ monoolein with one unsaturation, with the remainder being a $C_{18}$ monolinolein with two unsaturations and/or a saturated monoglycerol monoester; a monoglycerol monoester that has up to about 90% of monolinolein $C_{18}$ with two unsaturations, with the remainder being a monoolein $C_{18}$ with one unsaturation and/or a saturated monoglycerol monoester; or a mixture of a saturated or unsaturated di- or polyglycerol monoester and a di- or polyglycerol di ester or polyester or another food emulsifier. The composition exhibits in an aqueous phase a mesomorphic structure such as a cubic, lamellar, or hexagonal structure substantially encapsulating or combining the food ingredient.

17 Claims, 1 Drawing Sheet

FOOD COMPOSITION CONTAINING A MONOGLYCERIDE MEMOMORPHIC PHASE

CROSS REFERENCE TO RELATED APPLICATIONS

Continuity Statement

This application is a continuation-in-part of the U.S. national phase designation of co-pending PCT application no. PCT/EP99/01631 filed Mar. 12, 1999, the content of which is expressly incorporated herein by reference thereto.

FIELD OF THE INVENTION

The present invention relates to a food composition comprising at least one food ingredient and containing a monoglyceride mix, and the process for obtaining the food composition.

BACKGROUND OF THE INVENTION

Emulsifiers, such as monoglycerides, have an amphiphilic molecular structure. This means that a portion of the molecule is hydrophilic and another portion of the molecule is lipophilic. Because of this amphiphilic character, monoglycerides spontaneously form aggregates when placed in a solution or an aqueous dispersion. Various types of aggregates may be formed which depends on the molecular structure of the monoglyceride in water. Thus, it is possible to have either micelles, a crystalline liquid phase, such as a cubic, lamellar, or hexagonal phase, or a crystalline phase. All these structures are capable of incorporating or solubilizing host molecules. Because of the amphiphilic character of monoglycerides which leads to the formation of aggregates, it is possible to solubilize hydrophilic as well as lipophilic host molecules. The degree of solubilization depends on the molecular structure of the monoglyceride and on the host molecule.

Published patent applications WO 92/09209, EP 664083 and EP 547647 mention the use of crystalline liquid phases in foods. These applications are related because each describes the possibility of using such phases as a structuring agent of a food component that has a low fat content. In this regard, these applications focus on coagel and lamellar phases. It is generally known that many surfactants form such molecular arrangements over a wide range of temperatures and compositions when they are dispersed in water. Therefore, in these applications, there are only few limitations concerning the choice of the emulsifiers.

Studies have already been carried out on the use of cubic networks for encapsulating biologically active compounds. Compounds which react or affect living organisms and cells, such as lidocaine, gramicidin, insulin, BSA, or vitamins E have applications in pharmacy, medicine, or cosmetics. Patent applications WO 93/06921 and WO 84/02076 disclose uses in the field of medicine wherein the aim is to encapsulate an active ingredient so as to control its release. The disadvantage of these applications is that the monoglyceride used is very rich in monoolein, namely that it contains more than 90% thereof, and as a result, this increases the cost of the product and requires a more sophisticated method of use. Since high value-added products exist in the medical field, this can be tolerated and is acceptable. On the other hand, in the food sector, a high value-added product is hardly acceptable.

The present invention uses certain mesomorphic structures to carry out encapsulations of food products with monoglycerides, so as to control the release of food products without disadvantageous high costs. Accordingly, the present invention resolves the problems of the prior art by producing a food composition which is not very expensive and is simple to produce on a commercial scale using commercially available and inexpensive monoglycerides.

SUMMARY OF INVENTION

The goal of the present invention is to also benefit from the possibility of having certain mesomorphic structures which make it possible to carry out encapsulations of food products with monoglycerides, so as to control the release of such food products. According to the present invention, on the one hand, a result is obtained with a process of implementation which is not very expensive and which is simple and, on the other hand, it is possible to use commercially available, and therefore also inexpensive, monoglycerides.

The present invention is specifically directed to a food composition comprising at least one food ingredient in an amount sufficient to impart flavor to the composition; a monoglyceride mix in an amount sufficient to form a mesomorphic structure which substantially encapsulates the food ingredient; and water. The monoglyceride mix is preferably a monoglycerol monoester comprising up to about 90% of $C_{18}$ monoolein with one unsaturation, and the remainder being a $C_{18}$ monolinolein with two unsaturations or a saturated monoglycerol monoester; a monoglycerol monoester comprising up to about 90% of monolinolein $C_{18}$ with two unsaturations, and the remainder being a monoolein $C_{18}$ with one unsaturation or a saturated monoglycerol monoester; or a mixture of a saturated or unsaturated di- or polyglycerol monoester and a di- or polyglycerol di- or polyester, or another food emulsifier. The food composition has a mesomorphic structure selected from the group consisting of cubic, lamellar, hexagonal, and mixtures thereof in the aqueous phase. Preferably, the mesomorphic structure is a cubic structure.

In another embodiment of the invention, the saturated monoglycerol monoester is a saturated monoester monoglyceride in an amount up to about 30%. Optionally, the monoglyceride mix has at least one monoglyceride derivative or another food emulsifier, preferably one that is selected from the group consisting of tartaric acid ester, citric acid ester, sucrose ester, phospholipid, polyglycerol ester, and sodium stearoyl lactilate. The polyglycerol ester is the ester of propylene glycol.

The food composition may further comprise a stabilizing agent selected from the group consisting of starch, modified starch, milk proteins, soya bean proteins, surfactant hydrocolloids, and mixtures thereof. The surfactant hydrocolloids is selected from the group consisting of guar gum, carob gum, and mixtures thereof.

The food ingredient is selected from the group consisting of seasonings, flavorings, salts, sugars, oligosaccharides, amino acids, peptides, proteins, enzymes, polysaccharides, coffee flavorings, and mixtures thereof.

In another embodiment of the invention, the food composition is an aqueous solution having a dry matter content in an amount from about 0.2% to about 20% and a monoglyceride mix in an amount from about 0.1% to about 2% by weight of the composition. In yet another embodiment, the food composition is in aqueous form having a dry matter content in an amount from about 40% to about 50% and a monoglyceride mix in an amount from 0.1% to about 2% by weight of the composition. In another embodiment, the food composition is in powdered form and the monoglyceride mix is present in an amount from 0.1% to about 4% by weight of the food composition.

The invention is also directed to a process for making a food composition comprising the steps of: mixing a food ingredient in sufficient amount to impart flavor to the food composition with a monoglyceride mix present in sufficient amount to form a mesomorphic structure; adding water in sufficient amount to form a mixture having a mesomorphic structure in an aqueous solution; and adding the remainder of the food ingredient to the mixture to form the food composition.

In one embodiment of the process, the food ingredient is mixed in aqueous phase with the monoglyceride mix to form a mixture with the mesomorphic structure prior to adding sufficient water to form the food composition. In another embodiment, the food ingredient is mixed at room temperature with the monoglyceride mix and water to obtain a mixture having a water content from about 20% to about 45%, prior to adding the remainder of the food ingredient to the mixture to form the food composition. In yet another embodiment, the food ingredient and water are mixed to form in an aqueous phase, adding the aqueous phase, at room temperature, with the monoglyceride mix to form the composition with a water content greater than about 90%. Optionally, this process further comprises the step of aseptically filling the composition to obtain a ready-to-drink beverage.

The process may further comprise adding a stabilizer to the food composition, wherein, the stabilizer is selected from the group consisting of starch, modified starch, milk proteins, soya bean proteins, guar gum, carob gum, lysolecithin, sucrose esters, and mixtures thereof.

Unless otherwise specified, all percentages mentioned herein are weight percents.

DETAILED DESCRIPTION

Figure 1:
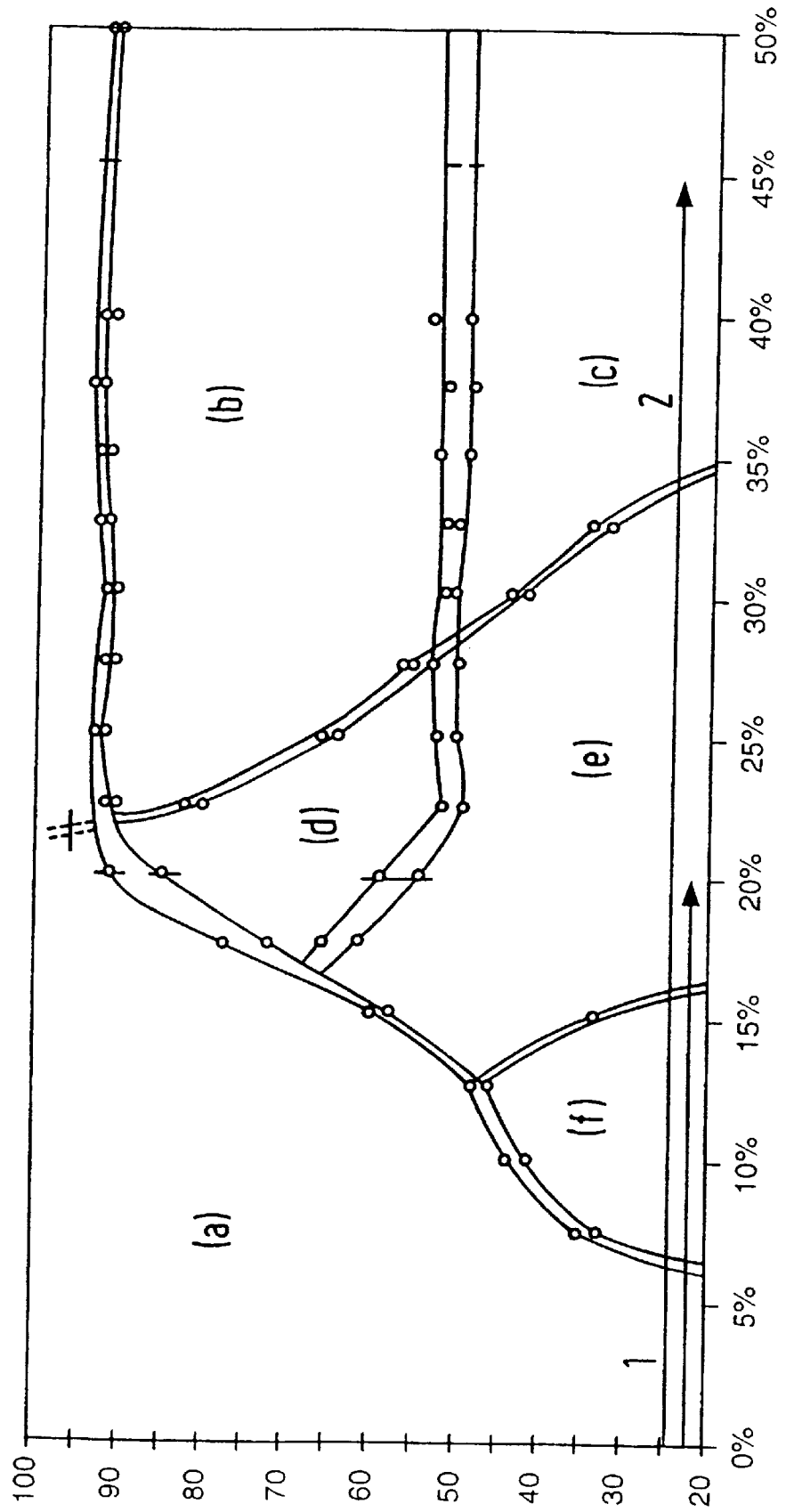
FIG. 1 is a phase diagram of a preferred monoglyceride according to the invention.

As used herein, the term "encapsulating" means that the food ingredient is substantially solubilized in the mesomorphic structure of the monoglyceride.

As used herein, the term "combining" means that the food ingredient is substantially adsorbed at the surface of the mesomorphic structure of the monoglyceride.

As used herein, the term "food composition" means any type of composition comprising food ingredients, alone or in the form of a mixture.

As used herein, the term "seasoning" is understood to mean any food product which imparts flavor to a food composition.

The present invention is directed to a food composition comprising at least one food ingredient in aqueous or powdered form, containing a monoglyceride mix. The monoglyceride mix is preferably a monoglycerol monoester comprising from about 1% to about 90% of $C_{18}$ monoolein with one unsaturation, with the remainder (i.e., from about 10 to about 99 or even 100%) being a $C_{18}$ monolinolein with two unsaturations and/or a saturated monoglycerol monoester; a monoglycerol monoester comprising from about 1% to about 90% of monolinolein $C_{18}$ with two unsaturations, with the remainder (i.e., from about 10 to about 99 or even 100%) being a monoolein $C_{18}$ with one unsaturation and/or a saturated monoglycerol monoester; or a mixture of a saturated or unsaturated di- or polyglycerol monoester and a di- or polyglycerol di- or polyester, or another food emulsifier. In the aqueous phase, the composition exhibits a mesomorphic structure such as a cubic, lamellar, or hexagonal structure encapsulating or combining the food ingredient. The amount of unsaturated compounds is expressed relative to the unsaturated compounds within the monoglyceride mix. Most preferably, unsaturated compounds constitute a maximum of about 90% by weight of the monoglyceride mix. The monoglyceride monoester preferably comprises about 60% to about 90% of monolein or about 60% to about 90% of monolinolien.

The monoglyceride mix used according to the invention typically contains up to about 30% of saturated monoester monoglycerides by weight of the monoglyceride mix. At least about 1% of this component is usually present. This monoglyceride mix is enriched with unsaturated compounds with up to about 30% of monoolein and up to about 80% of monolinolein, by weight. The monolein or monolinolein are each present in an amount of at least about 1%. The monoglyceride mix may be used alone or in the form of a mixture with a monoglyceride derivative or another emulsifier which are compatible in the food sector. The monoglyceride derivative or emulsifier are selected from the group consisting of tartaric acid ester, citric acid ester, sucrose ester, phospholipid, polyglycerol ester such as the esters of propylene glycol, sodium stearoyl lactilate, and mixtures thereof. These compounds may be used in a quantity such that they maintain the mesomorphic structure, i.e., the compounds substantially encapsulate the food ingredient with the monoglyceride mix.

The present invention solubilizes food ingredients in monoglyceride aggregates, for example, liquid crystalline phases, such as cubic, lamellar, or hexagonal, to control release or effect chemical stabilization (for example stabilization against oxidation) of the solubilized ingredients. The food ingredients are selected from the group consisting of seasonings, flavorings, salts, sugars, oligosaccharides, amino acids, peptides, proteins, enzymes, polysaccharides, coffee flavorings, and mixtures thereof.

The solubilizing agent according to the invention is a monoglyceride mix or a mixture of a monoglyceride mix with another food emulsifier. The solubilizing agent gives a crystalline liquid phase, preferably a cubic phase, when brought into contact with water or another solvent acceptable in the food sector, such as glycerol or ethanol. Preferably, a commercially available monoglyceride, such as that sold by the company DANISCO under the trademark DIMODAN LS, is used.

The composition according to the invention may either be used as such, or may be an intermediate composition which is added to make a finished product.

If the composition is an intermediate composition, it is possible to envisage encapsulation of a flavoring which is then incorporated into a dehydrated soup. In this case, the content of food ingredient may be up to about 50% of the monoglyceride mix. The encapsulated flavoring being present in an amount of about 1% to about 5% by weight in the dehydrated soup.

In one embodiment, the composition according to the invention can be used without further ingredients. In another embodiment, the composition can be used with a high water content, for example a ready-to-drink beverage. In the latter case, the embodiment comprises a water content of about 80% to about 99.8%, preferably from about 85% to about 97%, a dry matter content of about 0.2% to about 20%, preferably from about 0.5% to about 15%, and a monoglyceride mix content of about 0.01% to about 3%, preferably from about 0.1% to about 2% by weight of the composition. The dry matter can be either coffee dry extract, tea, cocoa extract, or any other extract for making a cold or hot beverage. The presence of monoglycerides controls the release of the flavoring in the mouth and stabilizes the aromatic components of the drink.

It is also possible according to the invention to prepare a food composition having a high dry matter content, for example of about 40% to about 50% by weight. In this case, the monoglyceride mix is present in an amount from about 0.01% to about 3%, preferably 0.1% to about 2%, calculated over the total composition weight.

According to another embodiment of the invention, the composition is in the form of an instant powder containing from about 0.1% to about 4% of monoglyceride mix by weight of the composition. This embodiment may be very appropriate for making coffee powder, tea powder, cocoa powder, and the like. Encapsulation with the monoglycerides allows, during the reconstitution of the powder in water, a delayed release of certain specific flavors of the food ingredient.

The cubic crystalline structure best delayed release of food products during tests. The measurements for demonstrating the structure were made with a polarized light microscope. Gas chromatography or an electronic sensor measured the release of the volatile flavorings.

In some embodiments, particularly in those compositions having a high water content, it is essential to add to the composition a stabilizing agent to stabilize the cubic phase. The stabilizing agent is selected from the group consisting of starch, modified starch, milk proteins, soya bean proteins, surfactant hydrocolloids, such as guar gum, carob gum, other low-molecular weight emulsifiers, such as lysolecithin, sucrose esters, and the like. The stabilizing gum is present in an amount of about 0.1% to about 5%. In the present description, all the proportions are given relative to the final composition.

Seasonings used include edible compositions commonly acceptable in the food industry. Preferably, the seasonings are selected from the group consisting of diacetyl, furfural, guaiacol, limonene, methyl pyrizine, vanillin, and mixtures thereof. Typically, the seasonings are present in an amount of about 1.5% to about 5% by weight of the composition.

Also, the invention is directed to the process for producing the food composition according to the invention. The food ingredient is mixed with the monoglyceride mix and a desired quantity of water to form a mixture with having substantially a mesomorphic structure. The remainder of the food ingredient may then be added to form the composition. Alternatively, the food ingredient is mixed in an aqueous phase with the monoglyceride mix, so as to form a mixture with a mesomorphic structure. Subsequently, this mixture is added to the remainder of the food ingredient containing water to obtain the food composition. The food ingredient should be present in sufficient amount to impart flavor to the food composition and the monoglyceride mix should be present in sufficient amount to form a mesomorphic structure. The implementation of the process depends on the monoglyceride mix used. Depending on the monoolein content of the monoglyceride mix, a more or less viscous composition will be formed in the form of a mixture with water, which can be worked with, more or less satisfactorily, at room temperature. Alternatively, the food ingredient can be added at a higher temperature to obtain a workable composition. The only condition in the latter case is to use a food ingredient which is not heat sensitive. If it is desired to encapsulate a food ingredient which is sensitive to heat, one possibility is to treat the food product close to room temperature.

Another embodiment of the process according to the invention comprises the steps of: mixing, preferably, at room temperature, a food ingredient with water, so as to obtain a mixture having a water content of from about 20% to about 45%, and adding the mixture to the remainder of the food ingredient. The food ingredient and water mixture are then added to the liquid monoglyceride mix prior to adding the desired quantity of water to form the food composition. Optionally, the water may contain another food ingredient.

In this process, the charged particles are formed in situ. The crystalline liquid phase, in which the food compound is solubilized, is formed as the monoglyceride takes up the water. The application of mechanical energy, such as by using moderate stirring or homogenization, fragments the liquid crystalline phase into small particles. In the aqueous phase, a stabilizing agent stabilizes the aggregates with respect to flocculation.

In another embodiment of the process, the process is conducted at room temperature. In this embodiment, the food ingredient in an aqueous phase is mixed with the monoglyceride to form a mixture. Subsequently, this mixture is added to the remainder of the food ingredient so as to obtain a composition having a water content greater than about 90% and an aseptic filling is carried out so as to obtain a ready-to-use beverage. In this case it is necessary to add a stabilizing agent.

FIG. 1 illustrates a phase diagram with a specific monoglyceride containing 10.6% of saturated compounds, 21.3% of C18 compounds with a single unsaturation, and 66.8% of C18 compounds with two unsaturations. The X-axis represents the increasing content of water and the Y-axis represents the temperature in degrees centigrade (° C.). When the monoglyceride is mixed at room temperature with water, the microemulsion zone (a) is first obtained. While maintaining room temperature, as the water content is increased to 10% to 15%, the mixture achieves a lamellar liquid phase (f), then with the water content between 20% and 30%, a cubic phase (e), and finally a phase (c) which is in equilibrium with the water and the cubic phase. If the mixing was carried out at a temperature of about 70° C., when the water content is about 20%, the mixture forms a hexagonal phase structure (d), once the water content is increased, the mixture is in equilibrium (b) between the water and the hexagonal phase. Preferably, in one embodiment of the invention, the composition is within phase zones (e) or (c). In the figure, if the arrows 1 and 2 are considered, the first embodiment of the process according to the invention exists.

EXAMPLES

Certain embodiments of the invention, as well as certain novel and unexpected advantages of the invention, are illustrated by the following non-limiting examples.

Example 1

7 g of a monoglyceride containing 10.6% of saturated compounds, 21.3% of C18 compounds with a single unsaturation, and 66.8% of C18 compounds with two unsaturations, 10 mg of a pure flavoring, and 3 g of water were mixed and heated to a temperature of 90° C. The mixture was vigorously stirred at 90° C. for a few seconds and then allowed cooled to room temperature. The composition had a cubic liquid crystalline phase. The flavoring release from the cubic phase was studied with a gas detection system. The flavoring release of the composition was reduced as compared to an untreated flavoring.

Example 2

2 g of the monoglyceride of Example 1 containing 100 mg of flavoring was mixed with 100 ml of an aqueous phase containing 20 g of modified starch. The mixture was heated to 90° C., homogenized, and cooled. A cubic phase having particle sizes of the order of 50 microns was obtained. The release of the solubilized flavoring was measured in the head space by gas chromatography. A modified release profile was observed.

Example 3

A dispersion of cubic particles containing a mixture of coffee flavor was formed by mixing 0.5 g of the monoglyceride of Example 1 (containing 100 mg of a special mixture of coffee flavor) with 100 g of a coffee extract liquor at room temperature. The coffee liquor was spray-dried or freeze-dried to obtain a powder. After reconstitution of the treated powder, a more controlled release of the flavoring and of the taste is obtained by reducing the kinetics of release, as compared with a reconstituted powder not containing the monoglyceride.

Example 4

A dispersion of cubic particles was obtained by mixing 0.1 g of the monoglyceride of Example 1 in 100 g of coffee liquor containing 100 mg of a mixture of coffee flavor. The coffee liquor was then spray-dried or freeze-dried.

Example 5

2 g of the monoglyceride of Example 1 containing coffee flavor were dispersed in 100 ml of an aqueous solution containing 20% of skimmed milk powder. The mixture was homogenized at 70° C. 10% to 20% of the dispersion was added to a ready-to-drink coffee beverage.

Example 6

A dispersion of cubic particles containing flavorings as described in Example 2 was freeze-dried or spray-dried and added to a freeze-dried soup.

What is claimed is:

1. A food composition comprising:
    at least one food ingredient in an amount sufficient to impart flavor to the composition;
    a monoglyceride mixture in an amount sufficient to form a mesomorphic structure which substantially encapsulates the food ingredient; and
    water;
    wherein the monoglyceride mix is (a) a monoglycerol monoester comprising up to about 90% by weight of C18 monoolein with one unsaturation, and about 10 to 100% by weight of a C18 monolinolein with two unsaturations; (b) a monoglycerol monoester comprising up to about 90% by weight of C18 monolinolein with two unsaturations, and about 10 to 100% by weight of a C18 monoolein with one unsaturation; (c) a mixture of (a) or (b) with a saturated monoglycerol monoester provided that the saturated monoglycerol monoester is present in an amount of no more than 30% by weight; or (d) a mixture of a saturated or unsaturated di- or polyglycerol monoester and one of a di- or polyglycerol di- or polyester or another food emulsifier, and
    wherein the composition has a mesomorphic structure that is cubic or hexagonal in the aqueous phase.

2. The food composition according to claim 1 wherein, the saturated monoglycerol monoester is a saturated monoester monoglyceride present in an amount of about 1 to about 30% and the structure substantially encapsulates or combines with at least a portion of the food ingredient.

3. The food composition according to claim 1, wherein the monoglyceride mix is (d) with the food emulsifier selected from the group consisting of tartaric acid ester, citric acid ester, sucrose ester, phospholipid, polyglycerol ester, and sodium stearoyl.

4. The food composition according to claim 3, wherein the monoglyceride mix (d) includes the polyglycerol monoester which is the ester of propylene glycol.

5. The food composition according to claim 1, further comprising a stabilizing agent selected from the group consisting of starch, modified starch, milk proteins, soya bean proteins, surfactant hydrocolloids, and mixtures thereof.

6. The food composition according to claim 5 wherein, the surfactant hydrocolloids is selected from the group consisting of guar gum, carob gum, and mixtures thereof.

7. The food composition according to claim 1 wherein, the food ingredient is selected from the group consisting of seasonings, flavorings, salts, sugars, oligosaccharides, amino acids, peptides, proteins, enzymes, polysaccharides, coffee flavorings, and mixtures thereof.

8. The food composition according to claim 1 wherein, the food composition is an aqueous solution having a dry matter content in an amount from about 0.2% to about 20% and a monoglyceride mix in an amount from about 0.1% to about 2% by weight of the composition.

9. The food composition according to claim 1 wherein, the food composition is in aqueous form having a dry matter content in an amount from about 40% to about 50% and a monoglyceride mix in an amount from 0.1% to about 2% by weight of the composition.

10. The food composition according to claim 1 wherein, the food composition is in powdered form and the monoglyceride mix is present in an amount from 0.1% to about 4% by weight of the food composition.

11. The food composition according to claim 1 wherein, the mesomorphic structure is a cubic structure.

12. The food composition according to claim 1 wherein, the monoglyceride mix further comprises from about 1% to about 30% monoolein or from about 1% to about 80% monolinolein, wherein the monoolein or monolinolein are present in an amount from about 1% to about 90% of the monoglyceride mix.

13. The food composition according to claim 1, wherein the monoglyceride mix is (a), comprising about 1 to 90% by weight of C18 monoolein with one unsaturation, and about 10 to 99% by weight of a C18 monolinolein with two unsaturations.

14. The food composition according to claim 1, wherein the monoglyceride mix is (b), comprising about 1 to 90% by weight of C18 monolinolein with two unsaturations, and about 10 to 99% by weight of a C18 monoolein with one unsaturation.

15. The food composition according to claim 1, wherein the monoglyceride mix is (c), comprising about 1 to 90% by weight of C18 monoolein with one unsaturation, about 10 to 99% by weight of a C18 monolinolein with two unsaturations and the saturated monoglycerol monoester.

16. The food composition according to claim 1, wherein the monoglyceride mix is (c), comprising about 1 to 90% by weight of C18 monolinolein with two unsaturations, about 10 to 99% by weight of a C18 monoolein with one unsaturation and the saturated monoglycerol monoester.

17. The food composition according to claim 1, wherein the monoglyceride mix is (d), comprising a mixture of a saturated or unsaturated di- or polyglycerol monoester and a di- or polyglycerol di- or polyester.

* * * * *

UNITED STATES PATENT AND TRADEMARK OFFICE
CERTIFICATE OF CORRECTION

PATENT NO.   : 6,569,478 B1
DATED        : May 27, 2003
INVENTOR(S)  : Leser et al.

It is certified that error appears in the above-identified patent and that said Letters Patent is hereby corrected as shown below:

<u>Title page, Item [54], and Column 1, line 2,</u>
Change "MEMOMORPHIC" to -- MESOMORPHIC --;

<u>Title page,</u>
Item [30], change "98104598" to -- 98104589 --.
Item [75], change "Boston, MA (US)" to -- Morges CH) --;

Signed and Sealed this

Thirtieth Day of September, 2003

JAMES E. ROGAN
*Director of the United States Patent and Trademark Office*